US011012322B2

(12) United States Patent
Circosta et al.

(10) Patent No.: US 11,012,322 B2
(45) Date of Patent: May 18, 2021

(54) NOTIFICATION OF SERVICE AVAILABILITY ON A DEVICE

(71) Applicant: Apple Inc., Cupertino, CA (US)

(72) Inventors: Nicholas J. Circosta, Mountain View, CA (US); Robert D. Butler, Middletown, DE (US); Daniel B. Pollack, San Jose, CA (US); Nelson M. Leduc, San Jose, CA (US); Ryan W. Baker, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/147,487

(22) Filed: Sep. 28, 2018

(65) Prior Publication Data

US 2020/0007415 A1    Jan. 2, 2020

Related U.S. Application Data

(60) Provisional application No. 62/692,580, filed on Jun. 29, 2018.

(51) Int. Cl.
*H04L 12/24* (2006.01)
*H04L 29/08* (2006.01)
*H04W 4/06* (2009.01)
*H04W 68/00* (2009.01)

(52) U.S. Cl.
CPC .......... *H04L 41/5012* (2013.01); *H04L 67/16* (2013.01); *H04W 4/06* (2013.01); *H04W 68/00* (2013.01)

(58) Field of Classification Search
USPC ........................................................ 709/223
See application file for complete search history.

(56) References Cited

U.S. PATENT DOCUMENTS

| | | | |
|---|---|---|---|
| 8,522,086 B1* | 8/2013 | Garrett ............... | G06F 11/3006 714/48 |
| 8,695,069 B1* | 4/2014 | Chandramohan ....... | H04L 63/08 726/6 |
| 9,147,340 B2 | 9/2015 | Kim et al. | |
| 9,225,787 B2 | 12/2015 | Jackson et al. | |
| 9,407,569 B1 | 8/2016 | Gupta et al. | |
| 2005/0154759 A1* | 7/2005 | Hofmeister .............. | G06F 8/61 |
| 2008/0192820 A1* | 8/2008 | Brooks ............ | H04N 21/47202 375/240.02 |

(Continued)

*Primary Examiner* — Hermon Asres
(74) *Attorney, Agent, or Firm* — Morgan, Lewis & Bockius LLP

(57) ABSTRACT

A device implementing a system for notifying a first device of availability of a service on a second device includes a processor configured to receive, from the first device of a first user, a first request with respect to whether a service is available on the second device of a second user, and to determine that the service is not available on the second device. The processor is further configured to send, to the first device and in response to the determination, an indication that the service is not available on the second device and an indication of a minimum amount of time before the first device can submit a second request with respect to whether the service is available on the second device. The minimum amount of time is based at least partially on an amount of time that has elapsed since the service was made available to the devices.

19 Claims, 8 Drawing Sheets

(56) References Cited

U.S. PATENT DOCUMENTS

| | | | |
|---|---|---|---|
| 2011/0137814 A1* | 6/2011 | Stewart | H04L 67/24 |
| | | | 705/319 |
| 2011/0137817 A1* | 6/2011 | Roumeliotis | H04L 63/102 |
| | | | 705/325 |
| 2011/0137995 A1* | 6/2011 | Stewart | H04L 67/18 |
| | | | 709/205 |
| 2015/0172395 A1* | 6/2015 | Jackson | H04L 67/18 |
| | | | 709/204 |
| 2018/0101801 A1 | 4/2018 | Renteria, Jr. et al. | |

* cited by examiner

NOTIFICATION OF SERVICE AVAILABILITY ON A DEVICE

CROSS-REFERENCE TO RELATED APPLICATIONS

The present application claims the benefit of U.S. Provisional Patent Application Ser. No. 62/692,580, entitled "Notification of Service Availability on a Device Technical Field," filed on Jun. 29, 2018, which is hereby incorporated by reference in its entirety for all purposes.

TECHNICAL FIELD

The present description relates generally to availability of a service on a device, including providing for notification, e.g., to other devices, of the availability of a service on a device.

BACKGROUND

A service may be available on a device of a user, the service providing for the user to interact with other users on their respective devices. The user may wish to interact with the other users via the service, thereby requiring that the service also be available on the respective devices of the other users.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
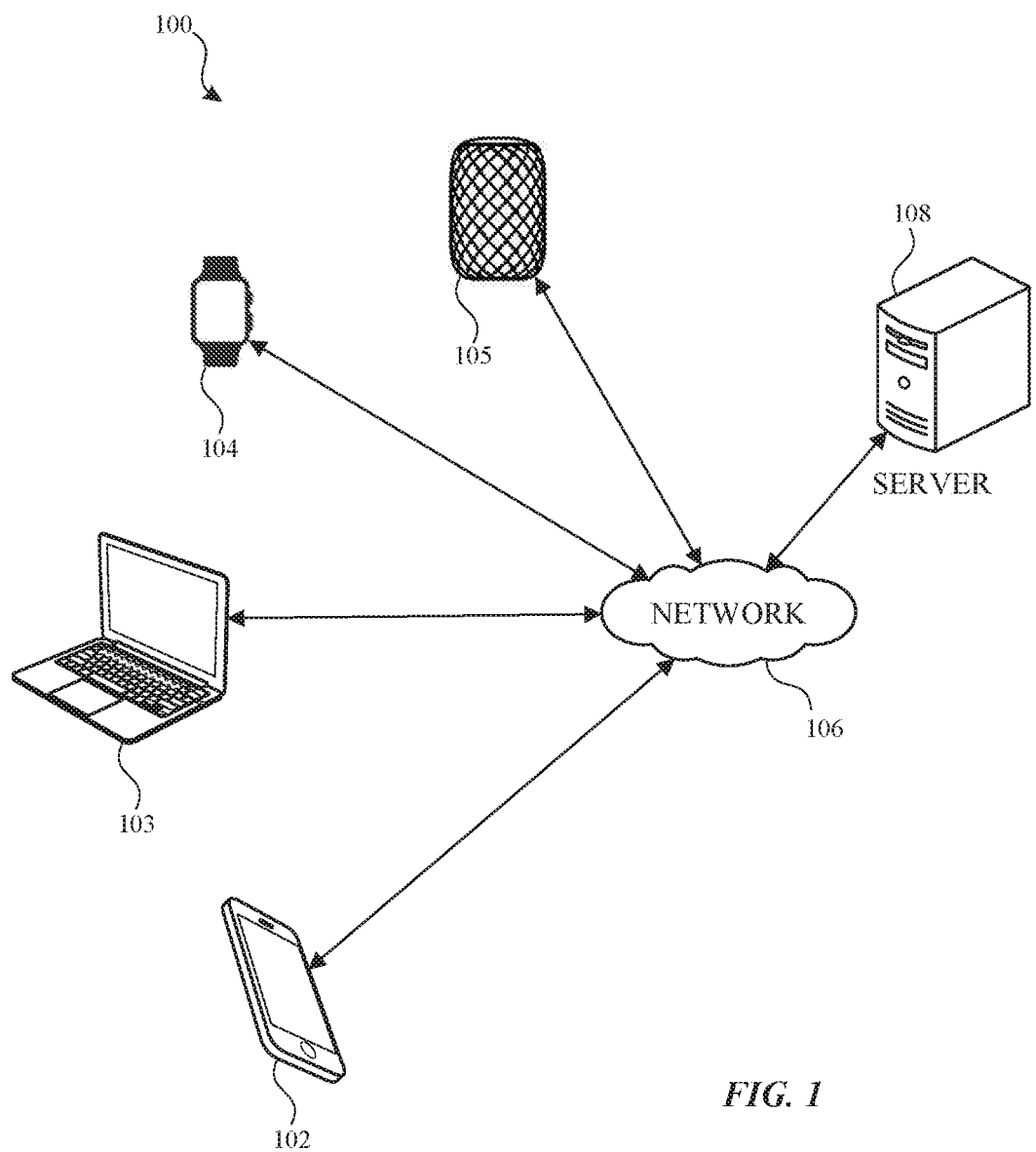
FIG. 1 illustrates an example network environment for providing notification of the availability of a service on a device in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A device of a user may provide a service that allows the user to interact with other user(s) on their respective devices. To interact with the other users via the service, the service should be available on the respective devices of the other users. In addition, the device of the user should be notified that the service is available on the respective devices of the other users, e.g., to prevent the device of the user from attempting to interact, via the service, with another device on which the service is not available.

For example, the user may wish to participate in audio-video conferencing with one or more other users, where the audio-video conferencing service provides for the reception and transmission of audio and/or video signals by user devices (e.g., at different locations), for communication between users in real-time. In some cases, an application for audio-video conferencing may be available on the one user's device, but not available on one or more devices of the one or more other users.

The subject system provides, to a device, a notification as to whether a service is available on another device. In one or more implementations, a device of a first user may receive user input associated with a service on a device of a second user. For example, the user input may be associated with initiating the service, or be associated with providing information (e.g., within a contact card) on the availability of the service on the second user's device. Responsive to receipt of the user input, the first user's device may send a request to a server, to check availability of the service on the second user's device.

The server may determine that the service is unavailable on the second user's device, and may send to the first user's device, an indication of the unavailability together with an indication of a minimum amount of wait time before the first user's device can send a subsequent, similar request to the server with respect to the second user's device. The minimum amount of time may be determined as a function of an amount of time that the service has been available to one or more of the devices (e.g., how much time has passed since a release date of the service). For example, the minimum amount of time may be proportional to the amount of time that the service has been available to one or more of the devices. The first user's device may store the indications of the unavailability and the minimum amount of time in a local cache, e.g., in association with an identifier of the second user and/or the second user's device.

The second user may subsequently download and/or otherwise make the service available on their device, and may send a corresponding update to the server. After the minimum amount of time has elapsed, and upon the first user's device receiving subsequent user input associated with the service on the second user's device, the first user's device may send another request to the server, to check availability of the service on the second user's device. In response, the server may determine that the service is available on the second user's device, and may send, to the first user's device, an indication of the service availability on the second user's device. The first user's device may then request to initiate the service with the second user's device (e.g., initiate audio-video conferencing).

In one or more implementations, after the second user's device downloads and/or otherwise makes the service available, the second user's device may send a message (e.g., via a different service, such as a messaging application) to the first user's device. The message may request that the first user's device flush its local cache with respect to prior indications of availability of the service on the second user's device. In one or more implementations, the message may be a silent message that is not displayed in the messaging transcript between the devices.

Thus, by setting a minimum amount of time between requests based on how long the service has been available, and/or by providing for messages (e.g., to flush specific cache data) between devices as services become available, it is possible to provide for more timely notifications of the availability of the service on the users' devices. As such, the subject system may provide for earlier and/or increased adoption/participation of services that provide for interaction between devices.

FIG. 1 illustrates an example network environment for providing notification of the availability of a service on a device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104 and 105 (hereinafter 102-105), a network 106 and a server 108. The network 106 may communicatively (directly or indirectly) couple, for example, any two or more of the electronic devices 102-105 and the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-105 and a single server 108; however, the network environment 100 may include any number of electronic devices and any number of servers.

One or more of the electronic devices 102-105 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a laptop computer, the electronic device 104 is depicted as a smartwatch, and the electronic device 105 is depicted as a smart speaker.

The electronic devices 102-105 may be configured to communicate or otherwise interact with each other based on one or more services that are available on the respective devices. For example, one of more of the electronic devices 102-105 may participate in messaging, audio-video conferencing and/or other communication provided by one or more service(s), provided that such service(s) are available on the respective participant devices. Moreover, the electronic devices 102-105 may be configured to provide and/or receive notifications related to the availability of such service(s) on respective device(s). Each of the electronic devices 102-105 may be, and/or may include all or part of, the device discussed below with respect to FIG. 2, and/or the electronic system discussed below with respect to FIG. 8.

The server 108 may be, and/or may include all or part of the device discussed below with respect to FIG. 2, and/or the electronic system discussed below with respect to FIG. 8. The server 108 may include one or more servers, such as a cloud of servers, that may be used to facilitate in providing notifications of the availability of services between the electronic devices 102-105. For explanatory purposes, a single server 108 is shown and discussed with respect to various operations, such as facilitating in audio-video conferencing. However, these and other operations discussed herein may be performed by one or more servers, and each different operation may be performed by the same or different servers.

Figure 2:
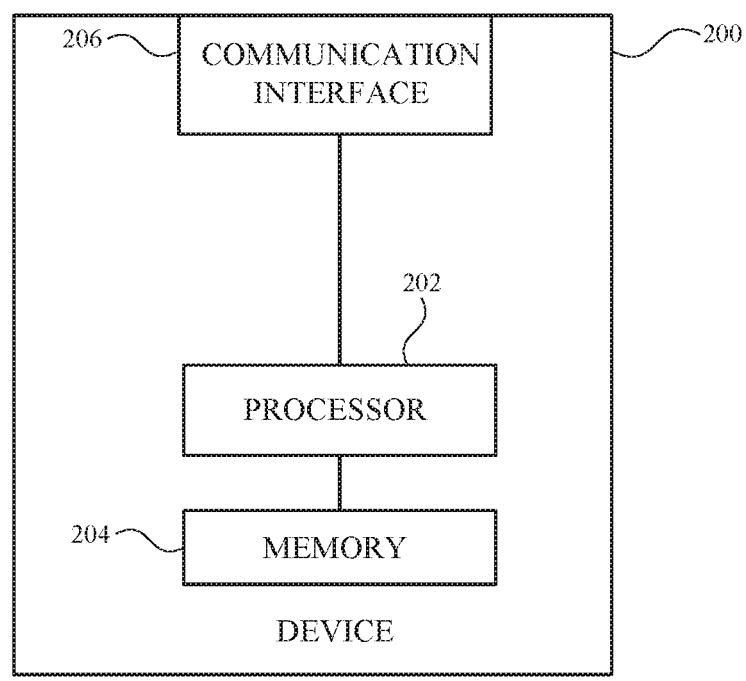
FIG. 2 illustrates an example device that may implement a system for providing notification of the availability of a service on a device in accordance with one or more implementations.

FIG. 2 illustrates an example device that may implement a system for providing notification of the availability of a service on a device in accordance with one or more implementations. For example, the device 200 of FIG. 2 can correspond to any of the electronic devices 102-105, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200. In the subject system, the processor 202 may implement architecture(s) for providing notification of the availability of a service on a remote device.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-105, the memory 204 may store an application (e.g., an audio-video conferencing application, a messaging application) corresponding to a service for communicating or otherwise interacting with other participant devices. In one or more implementations, the application providing such service may be part of or otherwise incorporated within the operating system of the electronic devices 102-105. Moreover, the memory 204 may implement a cache, for example, to store indication(s) of service availability with respect to remote devices, as discussed in further detail below with respect to FIGS. 3-7.

In one or more implementations, in a case where the device 200 corresponds to the server 108, the memory 204 may store one or more components configured to facilitate in providing notifications of the availability of services between the electronic devices 102-105.

The communication interface 206 may include suitable logic, circuitry, and/or code that enables wired or wireless communication, such as between any of the electronic devices 102-105 and the server 108 over the network 106. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
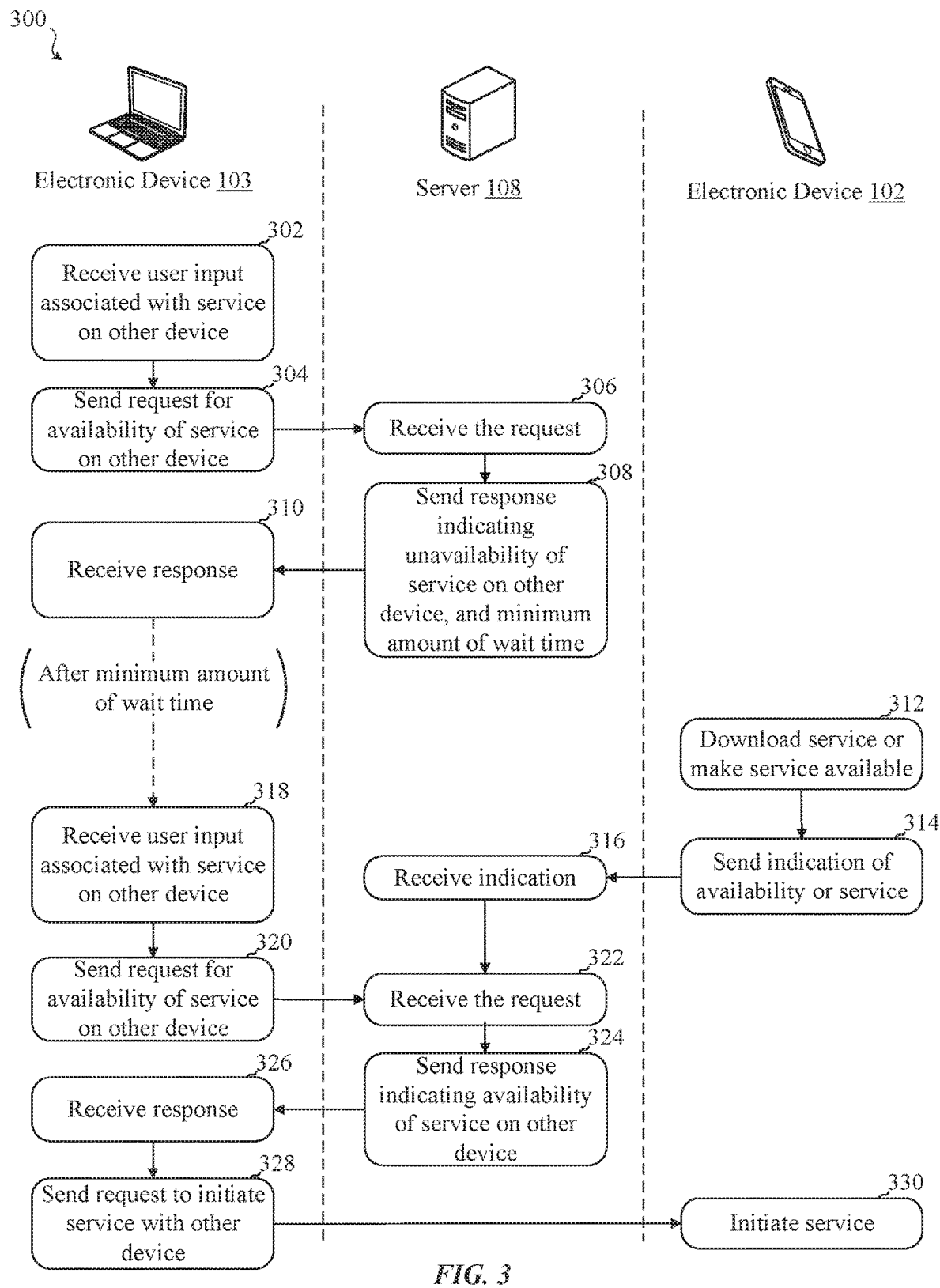
FIG. 3 illustrates an example process for providing notification of the availability of a service on a device in accordance with one or more implementations.

FIG. 3 illustrates an example process for providing notification of the availability of a service on a device in accordance with one or more implementations. For explanatory purposes, the process 300 is primarily described herein with reference to the server 108 and the electronic devices 102-103 of FIG. 1. However, the process 300 is not limited to the server 108 and the electronic devices 102-103 of FIG. 1, and one or more blocks (or operations) of the process 300 may be performed by one or more other components of the server 108 and other suitable devices (e.g., any of the electronic devices 102-105). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

In the example of FIG. 3, a first user of the electronic device 103 may wish to communicate or otherwise interact with a second user of the electronic device 102 (e.g., a remote device) via a service. For example, the service may be available on the electronic device 103 of the first user. However, the service may or may not be available on the electronic device 102. Examples of such services include, but are not limited to, services for messaging, audio and/or video conferencing, walkie-talkie communication, social networking, and/or other communication-based services.

In one or more implementations, the service may correspond to an application and/or feature made available by an operating system. For example, the service may have not have been available on prior version(s) of an operating system, but may become available on a current version of the operating system.

Alternatively and/or in addition, the service may not be part of an operating system, but may instead correspond to a separate application for downloading (e.g., from a server) and installing on a device. As such, the providing of notifications as described herein may apply to electronic devices running the same version of an operating system, different versions of the same operating system, and/or different operating systems.

The availability of the service for a particular device may be based on whether the corresponding application has been downloaded and installed on the device (e.g., as part of an operating system, or as a separate application). However, even if the operating system and/or application have been installed, it is still possible for the service not to be available on a device. For example, the application may have a user-selectable setting which allows a user to enable and/or disable the service. In another example, the service may be enabled and/or disabled based on administrative settings (e.g., where a particular version of the application is incompatible with other versions and flagged as disabled and/or the service is disabled through user and/or parental restrictions). As discussed further below, the availability of the service for a particular device may be communicated to the server 108, which in turn may notify other devices of the service availability for the particular device.

As shown in FIG. 3, the electronic device 103 receives user input associated with a service on the electronic device 102 (302). For example, the user input may correspond with the user requesting, via a user interface on the electronic device 103, to initiate the service with respect to the electronic device 103. The user interface may be provided by an application (e.g., audio-video conferencing) corresponding to the service on the electronic device 102. For example, the user on the electronic device 103 may select a contact (e.g., associated with the electronic device 102) within an audio-video conferencing application, e.g., in order to communicate with that contact in one-to-one communication. In another example, the user may select one or more contacts (e.g., associated with the electronic device 102 and other respective devices) within the audio-video conferencing application, to participate in a real-time, group conversation with one or more users. Selection of the contact(s) by the user may be based on respective email addresses and/or phone numbers of the contacts as locally stored on the electronic device 103).

Alternatively or in addition, the user input to initiate the service with the electronic device 103 may be received within a user interface provided by another application that differs from the application corresponding to the service. Using the example service of audio-video conferencing, the user interface for initiating the service may be provided within one or more of: a messaging application (e.g., as an interface element with an active group message thread or an one-one-one message thread), a phone application (e.g., a "recents" button or separate interface for selecting multiple contacts), a contact card, a walkie-talkie application, or the like.

In one or more implementations, the user input associated with the service (in block 302) may not correspond with initiating the service with the user of the electronic device 102. Rather, the user input may correspond with an interface that provides information of the user on the electronic device 102. For example, the local user at the electronic device 103 may select a contact card (e.g., within a contacts application, a phone application, messaging application, or the like) to display general information about the remote user. The information may include a name, email address, phone number, and/or other information of the remote user. The contact card may further display an indication of whether the other user has particular services available (e.g., by highlighting an icon representing the audio-video conferencing service), and the services may be initiated with the other user by selecting the respective icons. Thus, the user input associated with the service may correspond to the local user selecting, via the electronic device 103, the other user's contact card.

In response to receiving the user input (302), the electronic device 103 may send a request for availability of the service on the electronic device 102 (304), and the server 108 may receive the request (306). As noted above, the server 108 may be configured to receive communications regarding service availability updates, and these communications may be received from multiple devices. For example, upon a device (e.g., any of the electronic devices 102-105) installing an updated version of an operating system, that device may send an indication of the update to the server 108. The server 108 may maintain a data structure (e.g., a table) which stores the update regarding service availability. In one or more implementations, the data structure may store, in association with each user account, one or more of the following parameters: the device(s) associated with the user, the operating system version for each device, the applications installed on each device, an indication of whether any installed applications have been disabled/enabled, and session token information associated with the available services for each device. As updates are made to individual devices (e.g., by installing or uninstalling new operating systems and applications, and/or by enabling or disabling applications), the devices may communicate the updates to the server 108, which in turn may update the appropriate parameters in the data structure.

Thus, in response to the received request (306), the server 108 may determine the availability of the requested service on the electronic device 102. In the example of FIG. 3, the requested service is not available on the electronic device 102 at the time of the request is received by the server 108. As noted above, this may be due to the electronic device 102 running a version of an operating system that does not support the service, or due to the corresponding application not being installed or otherwise not being available with respect to the electronic device 102.

Thus, the server 108 may send a response to the electronic device 103 (308), and the electronic device 103 may receive the response (310) for storing in local cache. The response may include, among other values, an indication of the unavailability of the service on the electronic device 102 (corresponding to the remote user), and a minimum amount of time that the electronic device 103 is required to wait before sending a subsequent request for availability of the service on the electronic device 102.

In one or more implementations, the response provided by the server 108 to the electronic device 103 may include one or more of the following values: (1) a user identifier of the remote user; (2) a list of device identifiers associated with the remote user on which the service is available; for each device identified that has the service available, (2a) a session_token_refresh_time indicating an amount of time to wait before a session token should be refreshed, and (2b) a session_token_expire_time indicating an amount of time to wait before the session token expires and is required to be refreshed. Thus, the indication of the unavailability of the service for the remote user may be based the list of device identifiers being empty (e.g., meaning there are no devices of the user which provide the service). Moreover, the response may include a (3) negative_refresh_time indicating the above-mentioned minimum amount of time (e.g., if the service is unavailable for the remote user).

In one or more implementations, the minimum amount of wait time (e.g., negative_refresh_time) may be a value that varies based on an amount of time that has elapsed since the service was made available. For example, if the service was made available as part of a version of an operating system, the minimum amount of wait time may be based on the release date of the version of the operating system. In another example, if the service corresponds to an application that is not necessarily part of an operating system, the minimum amount of wait time may be based on the release date of the application. The server 108 may have predefined values for the minimum amount of wait time, based on the amount of time that has elapsed since the release date. For example, the server 108 may indicate a minimum amount of wait time of 5 minutes for a preset time period following the initial time of release (e.g., 2 days after release date). The minimum amount of wait time may increase (e.g., to 24 hours) after the preset time period has expired (e.g., after 2 days following release). In another example, the minimum amount of wait time may increase in a more gradual manner (e.g., from 5 minutes for the first 2 days, to 1 hour for the next week, and to 24 hours thereafter).

The minimum amount of time may be further based a total number of downloads and/or a rate of adoption (e.g., of an operating system version and/or application) corresponding to the service. For example, the server 108 may be configured to determine (e.g., in conjunction with a push notification service corresponding to the service) the number of downloads and/or rate of adoption of the service. The server 108 may be configured to adjust the minimum amount of wait time (e.g., negative_refresh_time) accordingly. For example, after a predefined number of downloads and/or after reaching a predefined rate of adoption, the server 108 may decrease the minimum amount of wait time (e.g., from 5 minutes to 1 hour, and from 1 hour to 24 hours, etc.). The adjustments in the minimum amount of wait time may be gradual, based on reaching different predefined numbers of downloads and/or different predefined rates of adoption, e.g., so as to balance the load on the server 108 with respect to the service availability requests.

In one or more implementations, the minimum amount of wait time may be implemented as a time to live value. As noted above, upon receipt of the server-provided response (310), the electronic device 103 may store the response in local cache of the electronic device 103 (e.g., as implemented in the memory 204 of the electronic device 103). In this regard, the negative_refresh_time (e.g., corresponding to the minimum amount of wait time) may indicate a time to live, and specify how long the indication of the unavailable service is stored in cache before that part of the cache should be flushed. As noted above, the notification of the service being unavailable may be based on the list of device identifiers (e.g., as provided in the response) for the remote user being empty.

Thus, in one or more implementations, after the negative_refresh_time has expired, the electronic device 103 may automatically flush the cache with respect to the received response. As a result, the electronic device 103 would no longer be able to access the indication of service availability in cache. As such, the electronic device 103 would be required to query the server with respect to whether the service has become available on the electronic device 102 (e.g., the remote device), upon subsequent user input via the electronic device 103 associated with the service on the electronic device 102. In other words, in one or more implementations, the electronic device 103 may not automatically refresh the indication when the time to live value expires, but may wait for subsequent user input associated with the service on the electronic device 102 before refreshing the indication, e.g., by requesting the indication from the server 108.

After the electronic device 103 has received the response (310), the electronic device 102 may have downloaded the service or otherwise made the service available (312). For example, the electronic device 102 may have downloaded the corresponding version of the operating system, the corresponding application and/or enabled the previously-disabled service. The electronic device 102 may send an indication of availability of the service to the server 108 (314), and the server 108 may receive the indication (316). As noted above, the server 108 may update the appropriate parameters in the data structure (e.g., table) storing the availability of services for each device. The parameters may indicate availability of the service with respect to the electronic device 102 and/or session token information (e.g., times) associated with the availability.

After the minimum amount of wait time has elapsed for the electronic device 103 (e.g., corresponding to the flushing of its cache with respect to the unavailability of the service), the electronic device 103 receives subsequent user input associated with the service on the electronic device 102 (318). As noted above, the user input may correspond to initiating the service with respect to the electronic device 102 and/or selecting a contact card of the user of the electronic device 102. As such, the electronic device 103 may send a second request to the server 108, for availability of the service on the electronic device 102 (320), and the server 108 may receive the request (322).

In response, the server 108 may determine (e.g., based on the data structure storing service availabilities across devices) that the service is available on the electronic device 102, and generate a response to indicate the availability of the service. As noted above, the response generated by the server 108 may include: (1) a user identifier for the remote user; and (2) a list of device identifiers associated with the remote user on which the service is available; for each device identified that has the service available, (2a) a session_token_refresh_time indicating an amount of time to wait before a session token should be refreshed, and (2b) a session_token_expire_time indicating an amount of time to wait before the session token expires and is required to be refreshed.

Since the service is available, the response generated by the server 108 may include a list of device identifiers associated with the other user on which the service is available (e.g., at least an identifier for the electronic device 102). The response may further include the session_token_refresh_time (e.g., 1 day, corresponding to a soft cache period suggesting to flush cache with respect to service availability) and a session_token_expire_time (e.g., 1 week, requiring to flush cache with respect to service availability). In one or more implementations, the session_token_refresh_time and the session_token_expire_time may be decreased to reduce spam and/or unwanted communications, based on the service (e.g., messaging).

The server 108 may send the generated response, indicating availability of the service on the electronic device 102, to the electronic device 103 (324). The electronic device 103 may receive the response (326). In a case where the user input received at block 318 corresponded with the user initiating the service (e.g., initiating an audio-video conference), the electronic device 103 may send a request to initiate the service to the electronic device 102 (328), and the electronic device 102 may receive the request and initiate the service (330). Alternatively or in addition, in a case where the user input received at block 318 corresponded with user selection of a contact card, the electronic device 103 may locally indicate that the remote user is available for the service (e.g., by highlighting an icon corresponding to the service).

Figure 4:
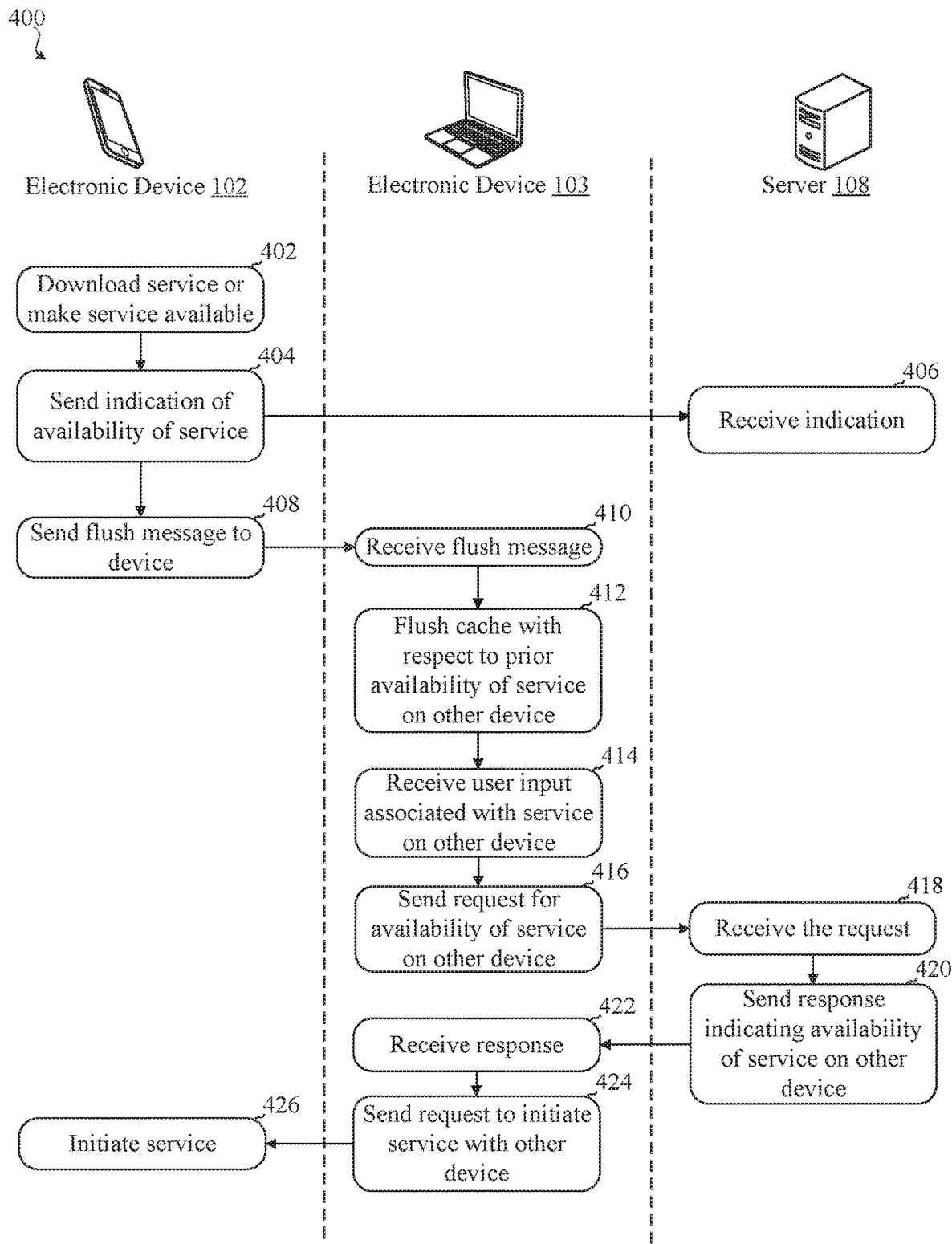
FIG. 4 illustrates another example process for providing notification of the availability of a service on a device in accordance with one or more implementations.

FIG. 4 illustrates another example process for providing notification of the availability of a service on a remote device in accordance with one or more implementations. For explanatory purposes, the process 400 is primarily described herein with reference to the server 108 and the electronic devices 102-103 of FIG. 1. However, the process 400 is not limited to the server 108 and the electronic devices 102-103 of FIG. 1, and one or more blocks (or operations) of the process 400 may be performed by one or more other components of the server 108 and other suitable devices (e.g., any of the electronic devices 102-105). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

As noted above with respect to FIG. 3, the server 108 may provide the electronic device 103 with notifications of the availability of a service on the electronic device 102. FIG. 4 provides an example of the electronic device 102 instructing the electronic device 103 to flush its local cache with respect to availability of the service on the electronic device 102.

To provide such a direct message, the electronic devices 102-103 may already be in communication via a first service (e.g., which differs from the requested service). For example, the first service can be, but is not limited to, a messaging application. The messaging application may be included as part of an operating system, a separate stand-alone application installed on one or more of the electronic devices 102-103, or may be part of another application installed on one or more of the electronic devices 102-103 (e.g., part of a social networking application).

Thus, after downloading or otherwise making a service such as audio-video conferencing available (402), the electronic device 102 may send an indication of the update to the server 108 (404). The server may receive the indication (406), and update the appropriate parameters in the data structure that stores availability of services across devices.

The electronic device 102 may then generate and send a message to the electronic device 103 (408), instructing the electronic device 103 to flush its local cache with respect to the availability of the service on the electronic device 102. In one or more implementations, the electronic device 102 may be configured to send the message to all devices with which the electronic device 102 has interacted via the first service (e.g., the messaging application) within a predefined time period (e.g., within the last month).

The electronic device 103 may receive the message via the first service (410). In one or more implementations, the message to flush the cache may further instruct the electronic device 103 to flush its local cache with respect to the availability of the first service (e.g., the messaging application) on the electronic device 102. Thus, the message may instruct flushing cache for both the service being requested (e.g., audio-video conferencing) and the first service by which the message is sent (e.g., the messaging application).

In one or more implementations, the message to flush the cache may be configured to not be visible within a messaging thread of the first service (e.g., the messaging application). In this way, a user on either of the electronic devices 102-103 would not be able to view or otherwise be aware of the message instructing the clearing of the cache with respect to service availability. In one or more implementations, the message may be presented in the messaging thread as a notification that the electronic device 103 is now capable of performing the service.

In response to receiving the message, the electronic device 103 may flush its cache with respect to the prior availability of the service on the electronic device 102 (412). If instructed by the message, the electronic device 103 may also flush its cache with respect to the availability of the first service (e.g., the messaging application) on the electronic device 102.

At a subsequent time, the electronic device 103 may receive user input associated with the service on the electronic device 102 (414). The user input may correspond to initiating the service with respect to the electronic device 102 and/or selecting a contact card of the user of the electronic device 102. The electronic device 103 may send a corresponding request to the server 108, for availability of the service on the electronic device 102 (416), and the server 108 may receive the request (418).

In response, the server 108 may determine (e.g., based on the data structure storing service availabilities across devices) that the service is available on the electronic device 102, and generate a response to indicate the availability of the service. For example, the response generated by the server 108 may include a list of device identifiers associated with the remote user on which the service is available (e.g., an identifier for the electronic device 102). The response may further include the session_token_refresh_time (e.g., 1 day) and a session_token_expire_time (e.g., 1 week).

The server 108 may send the generated response, indicating availability of the service on the electronic device 102, to the electronic device 103 (420), and the electronic device 103 may receive the response (422), In a case where the user input received at block 414 corresponded with the user initiating the service (e.g., initiating an audio-video conference), the electronic device 103 may send a request to initiate the service to the electronic device 102 (424), and the electronic device 102 may receive the request and initiate the service (426). Alternatively or in addition, in a case where the user input received at block 414 corresponded with user selection of a contact card, the electronic device 103 may locally indicate that the remote user is available for the service (e.g., by highlighting a respective icon).

In one or more implementations, a user of the electronic device 102 may register an additional device (e.g., the electronic device 104) with his/her user account. The electronic device 102 may be notified (e.g., via the server 108) after the user successfully logs into the added electronic device 104. In addition, the electronic device 102 may be configured to send a message to the electronic device 103 to locally flush its cache with respect to the first service (e.g., the messaging application) and/or the service requested by the electronic device 103 (e.g., audio-video conferencing). In this manner, the electronic device 103 would be required to check service availability with respect to the other user (e.g., now associated with the electronic device 102 and 104), and the server may return an appropriate response (e.g., indicating whether any of the electronic devices 102 or 104 have the service available, with respective session tokens for each device which has the service available).

Thus, by setting a minimum amount of time between requests based on how long the service has been available (e.g., as discussed with respect to FIG. 3), and/or by providing for messages (e.g., to flush specific cache data) between devices as services become available (e.g., as discussed with respect to FIG. 4), it is possible to provide for more timely notifications of the availability of services on devices. As such, the subject system may provide for earlier and/or increased adoption/participation of services that relate to interaction between devices. Moreover, load on the server may be reduced, since the requests to flush are further in response to user input associated with a service, as opposed to requests being sent automatically once the minimum amount of time has elapsed.

Figure 5:
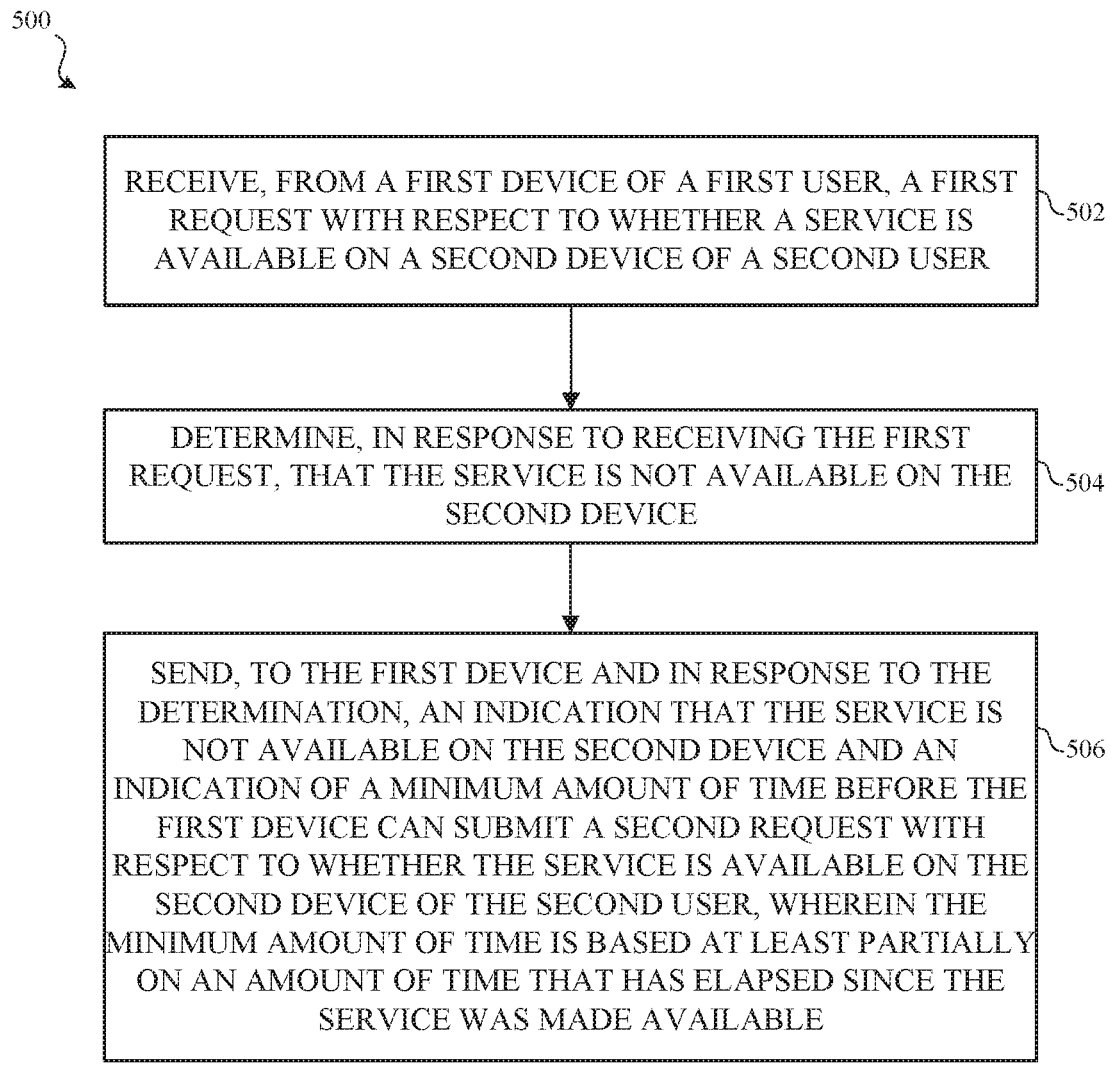
FIG. 5 illustrates an example process by a server for providing a first device with notification of the availability of a service on a second device in accordance with one or more implementations in accordance with one or more implementations.

FIG. 5 illustrates an example process by a server (e.g., the server 108) for providing a first device (e.g., the electronic device 103) with notification of the availability of a service on a second device (e.g., the electronic device 102) in accordance with one or more implementations in accordance with one or more implementations. For explanatory purposes, the process 500 is primarily described herein with reference to the server 108 and the electronic devices 102-103 of FIG. 1. However, the process 500 is not limited to the server 108 and the electronic devices 102-103 of FIG. 1, and one or more blocks (or operations) of the process 500 may be performed by one or more other components of the server 108 and other suitable devices (e.g., any of the electronic devices 102-105). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The server 108 receives, from the electronic device 103 of a first user, a first request with respect to whether a service is available on the electronic device 102 of a second user (502). The server 108 determines, in response to receiving the first request, that the service is not available on the electronic device 102 (504).

Determining that the service is not available on the electronic device 102 may be based on an operating system running on the electronic device 102. Alternatively or in addition, determining that the service is not available on the electronic device 102 may be based on a version of an operating system running on the electronic device 102.

The first request may include an email address or a phone number of the second user. Determining that the service is not available on the electronic device 102 may be based on a user account corresponding to the email address or the phone number.

The server 108 sends, to the electronic device 103 and in response to the determination, an indication that the service is not available on the electronic device 102 and an indication of a minimum amount of time before the electronic device 103 can submit a second request with respect to whether the service is available on the electronic device 102 of the second user (506). The minimum amount of time is based at least partially on an amount of time that has elapsed since the service was made available.

The minimum amount of time may be further based a total number of downloads corresponding to installations of the service. Alternatively or in addition, the minimum amount of time may be further based on a rate of adoption corresponding to the service.

The server 108 may receive, from the electronic device 103, the second request with respect to whether the service is available on the electronic device 102. The second request may be received after the minimum amount of time has elapsed. The server 108 may determine, in response to receiving the second request, that the service is available on the electronic device 102. The server 108 may send, to the electronic device 103 and in response to the determination that the service is available on the electronic device 102, an indication that the service is available on the electronic device 102.

Figure 6:
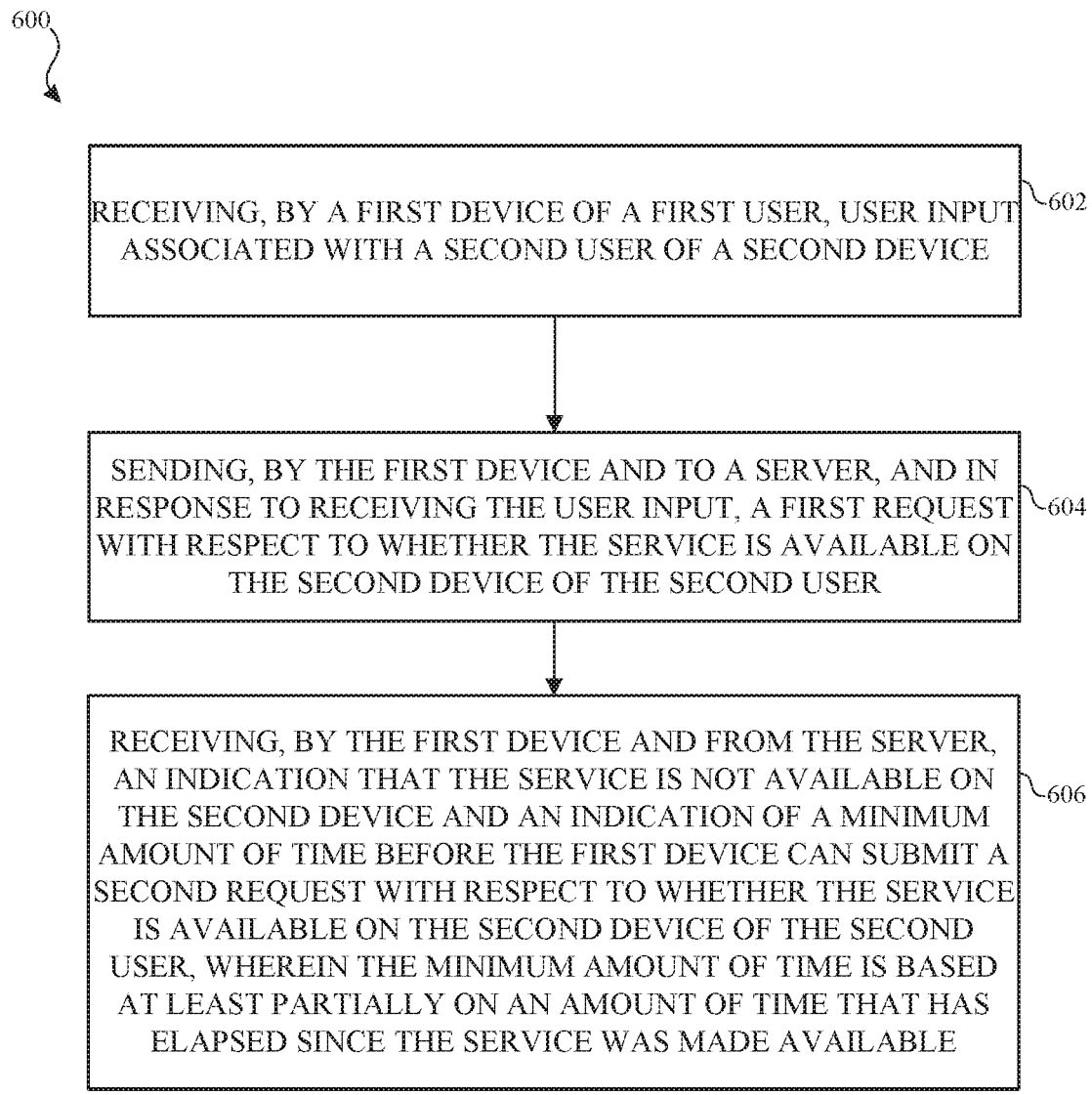
FIG. 6 illustrates an example process by a client device for receiving notification of the availability of a service on another device in accordance with one or more implementations in accordance with one or more implementations.

FIG. 6 illustrates an example process by a client device (e.g., the electronic device 103) for receiving notification of the availability of a service on a remote device (e.g., the electronic device 102) in accordance with one or more implementations in accordance with one or more implementations. For explanatory purposes, the process 600 is primarily described herein with reference to the electronic devices 102-103 and the server 108 and of FIG. 1. However, the process 600 is not limited the electronic devices 102-103 and the server 108 of FIG. 1, and one or more blocks (or operations) of the process 600 may be performed by one or more other components of the server 108 and other suitable devices (e.g., any of the electronic devices 102-105). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 103 of a first user receives user input associated with a second user of the electronic device 102 (602). The user input may correspond to at least one of initiating the service with the electronic device 102 of the second user, or selecting a contact card corresponding to the second user which indicates whether the service is available on the electronic device 102.

The electronic device 103 sends, to the server 108 and in response to receiving the user input, a first request with respect to whether the service is available on the electronic device 102 of the second user (604). The first request may include an email address or a phone number of the second user. The indication that the service is not available on the electronic device 102 may be based on a user account corresponding to the email address or the phone number.

The electronic device 103 receives, from the server 108, an indication that the service is not available on the electronic device 102 and an indication of a minimum amount of time before the electronic device 103 can submit a second request with respect to whether the service is available on the electronic device 102 of the second user (606). The minimum amount of time is based at least partially on an amount of time that has elapsed since the service was made available.

The minimum amount of time may be further based a total number of downloads corresponding to installations of the service. Alternatively or in addition, the minimum amount of time may be further based on a rate of adoption corresponding to the service.

The electronic device 103 may receive subsequent user input associated with the user of the electronic device 102, before the minimum amount of time has elapsed. In response, the electronic device 103 may provide an indication that the service is not available on the electronic device 102.

The electronic device 103 may send, to the server 108, the second request with respect to whether the service is available on the electronic device 102 (e.g., after the minimum amount of time has elapsed). The electronic device 103 may receive, from the server 108, an indication that the service is available on the electronic device 102. The electronic device 103 may receive, from the server 108, an indication of an amount of time for a session token corresponding to availability of the service on the electronic device 102.

Figure 7:
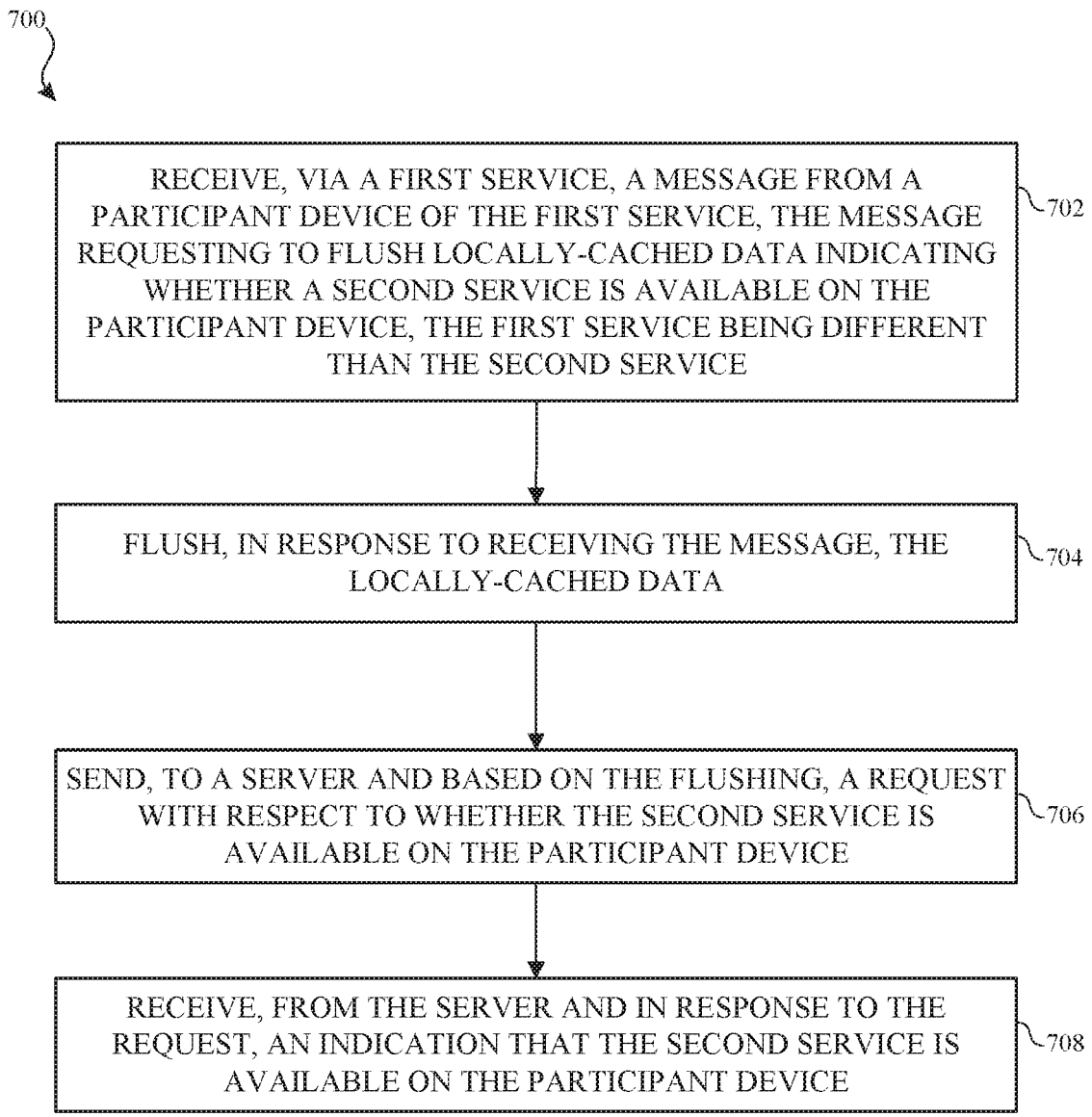
FIG. 7 illustrates another example process by a client device for receiving notification of the availability of a service on another device in accordance with one or more implementations in accordance with one or more implementations.

FIG. 7 illustrates another example process by a client device (e.g., the electronic device 103) for receiving notification of the availability of a service on a remote device (e.g., the electronic device 102) in accordance with one or more implementations in accordance with one or more implementations. For explanatory purposes, the process 700 is primarily described herein with reference to the electronic devices 102-103 and the server 108 of FIG. 1. However, the process 700 is not limited to the electronic devices 102-103 and the server 108 of FIG. 1, and one or more blocks (or operations) of the process 700 may be performed by one or more other components of the server 108 and other suitable devices (e.g., any of the electronic devices 102-105). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 103 receives, via a first service, a message from the electronic device 102 (e.g., a participant of the first service), the message requesting to flush locally-cached data on the electronic device 102 (702). The locally-cached data indicates whether a second service is available on the electronic device 102, with the first service being different than the second service. For example, the locally-cached data may indicate that the second service is not available on the electronic device 102, and may further indicate the above-mentioned minimum amount of wait time.

The electronic device 102 may have sent the message to the electronic device 103 after downloading the second service or otherwise making the second service available. Availability of the second service on the electronic device 102 may be based on an operating system running on the electronic device 102 or a version of an operating system running on the electronic device 102.

The first service may be a messaging service, and the message may be not visible in an active thread of the messaging service. The second service may be an audio-video conferencing service which is configured to be launched via an interface of the messaging service. The electronic device 102 may be configured to send the message to all devices with which the electronic device 102 has interacted via the first service within a predefined time period.

The electronic device 103 flushes, in response to receiving the message, the locally-cached data (704). The message may further request the electronic device 103 to flush second locally-cached data indicating whether the first service is available on the electronic device 102. The electronic device 103 may flush, in response to receiving the message, the second locally-cached data.

The electronic device 103 sends, to the server 108 and based on the flushing, a request with respect to whether the second service is available on the electronic device 102 (706). The electronic device 103 receives, from the server 108 and in response to the request, an indication that the second service is available on the electronic device 102 (708).

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPPA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 8:
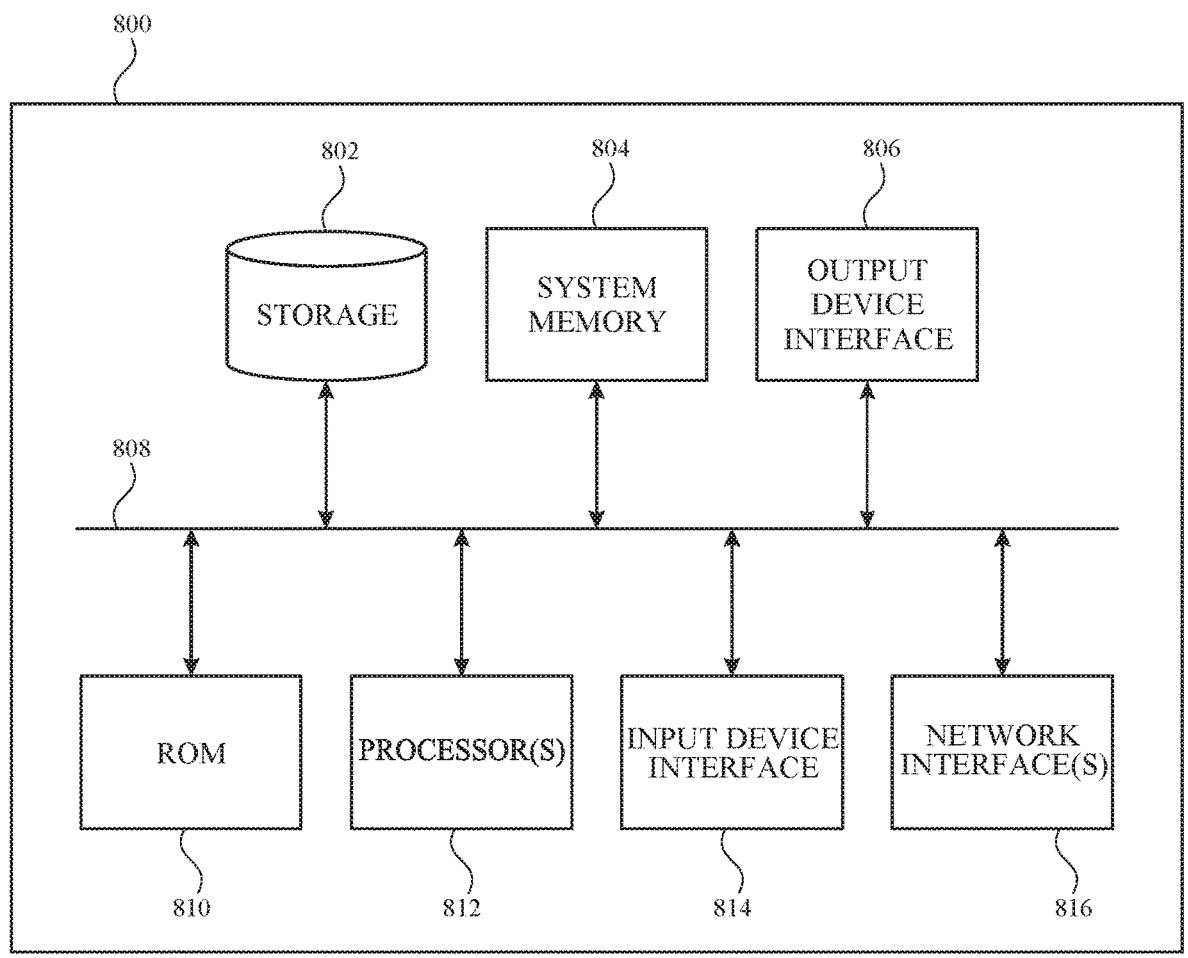
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 82-105, and/or one or the server 108 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the server 108 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   at least one processor; and
   a memory including instructions that, when executed by the at least one processor, cause the at least one processor to:
      receive, from a first device of a first user, a first request with respect to whether a software service is available to run on a second device of a second user;
      determine, in response to receiving the first request, that the service is not available on the second device;
      send, to the first device and in response to the determination, an indication that the service is not available on the second device and an indication of a minimum amount of time before the first device can submit a second request with respect to whether the service is available on the second device of the second user, wherein the minimum amount of time is based at least partially on an amount of time that has elapsed since the service was made available to at least one of the first or second devices;
      receive, from the first device, the second request with respect to whether the service is available on the second device, wherein the second request is received after the minimum amount of time has elapsed; and
      determine, in response to receiving the second request, whether the service is available on the second device.

2. The device of claim 1, wherein the instructions further cause the at least one processor to:
   send, to the first device and in response to the determination that the service is available on the second device, an indication that the service is available on the second device.

3. The device of claim 1, wherein determining that the service is not available on the second device is based on an operating system of the second device or a version of an operating system of on the second device.

4. The device of claim 1, wherein the minimum amount of time is further based a total number of downloads corresponding to the service.

5. The device of claim 1, wherein the minimum amount of time is further based on a rate of adoption corresponding to the service.

6. The device of claim 1, wherein the first request comprises an email address or a phone number of the second user, and wherein determining that the service is not available on the second device is based on a user account corresponding to the email address or the phone number.

7. A method, comprising:
   receiving, by a first device of a first user, user input associated with a second user of a second device;
   sending, by the first device and to a server, in response to receiving the user input, a first request with respect to whether a software service is available to run on the second device of the second user;
   receiving, by the first device and from the server, an indication that the service is not available on the second device and an indication of a minimum amount of time before the first device can submit a second request with respect to whether the service is available on the second device of the second user, wherein the minimum amount of time is based at least partially on an amount of time that has elapsed since the service was made available; and sending, by the first device and to the server, the second request with respect to whether the service is available on the second device, wherein the second request is sent after the minimum amount of time has elapsed.

8. The method of claim 7, further comprising:

receiving, by the first device and from the server, an indication that the service is available on the second device.

9. The method of claim 7, further comprising:

receiving, by the first device, second user input associated with the second user of the second device, wherein the second user input is received before the minimum amount of time has elapsed; and proving, by the first device, an indication that the service is not available on the second device of the second user.

10. The method of claim 7, further comprising:

receiving, by the first device and from the server, an indication of an amount of time for a session token corresponding to availability of the service on the second device.

11. The method of claim 7, wherein the minimum amount of time is further based a total number of downloads corresponding to installations of the service.

12. The method of claim 7, wherein the minimum amount of time is further based on a rate of adoption corresponding to the service.

13. A computer program product comprising code stored in a non-transitory computer-readable storage medium, the code comprising:

code to receive, via a first service, a message from a participant device of the first service, the message requesting to flush locally-cached data indicating that a second service is not available on the participant device and an indication of a minimum amount of time before sending a request with respect to whether the second service is available on the participant device, the first service being different than the second service, the second service being a software service;

code to flush, in response to receiving the message, the locally-cached data;

code to send, to a server and based on the flushing, the request with respect to whether the second service is available on the participant device; and code to receive, from the server and in response to the request, an indication that the second service is available on the participant device.

14. The computer program product of claim 13, wherein availability of the second service on the participant device is based on an operating system running on the participant device or a version of an operating system running on the participant device.

15. The computer program product of claim 13, wherein the participant device is configured to send the message to all devices with which the participant device has interacted via the first service within a predefined time period.

16. The computer program product of claim 13, wherein the message further requests to flush second locally-cached data indicating whether the first service is available on the participant device.

17. The computer program product of claim 16, the code further comprising:

code to flush, in response to receiving the message, the second locally-cached data.

18. The computer program product of claim 13, wherein the first service is a messaging service, and wherein the message is not visible in an active thread of the messaging service.

19. The computer program product of claim 18, wherein the second service is an audio-video conferencing service which is configured to be launched via an interface of the messaging service.

\* \* \* \* \*

UNITED STATES PATENT AND TRADEMARK OFFICE
CERTIFICATE OF CORRECTION

PATENT NO. : 11,012,322 B2
APPLICATION NO. : 16/147487
DATED : May 18, 2021
INVENTOR(S) : Nicholas J. Circosta et al.

Page 1 of 1

It is certified that error appears in the above-identified patent and that said Letters Patent is hereby corrected as shown below:

In the Claims

Column 20, Line 46 (Claim 3), Replace "operating system of on the second device.", with --operating system of the second device.--;

Column 20, Line 48 (Claim 4), Replace "further based a total number", with --further based on a total number--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*